(12) United States Patent
Grote

(10) Patent No.: US 6,419,258 B1
(45) Date of Patent: Jul. 16, 2002

(54) LOCKING MECHANISM FOR TRAILER HITCH SECURITY LOCK

(75) Inventor: Jeff M. Grote, Ankeny, IA (US)

(73) Assignee: Neff Co Technologies, Arcadia, IA (US)

( * ) Notice: Subject to any disclaimer, the term of this patent is extended or adjusted under 35 U.S.C. 154(b) by 0 days.

(21) Appl. No.: 09/629,513

(22) Filed: Aug. 1, 2000

(51) Int. Cl.[7] ............................................. B62D 1/58
(52) U.S. Cl. ............................ 280/507; 70/34; 70/14; 70/258
(58) Field of Search ............................ 280/507; 70/34, 70/14, 258, 232, 58

(56) References Cited

U.S. PATENT DOCUMENTS

| | | | |
|---|---|---|---|
| 3,226,133 A | 12/1965 | Geresy | 280/507 |
| 3,631,896 A * | 1/1972 | Meigs | |
| 3,733,863 A | 5/1973 | Toepfer | 70/363 |
| 3,810,664 A | 5/1974 | Nunnick, Jr. et al. | 280/507 |
| 4,075,878 A | 2/1978 | Best | 70/49 |
| 4,186,940 A | 2/1980 | Pillars | 280/507 |
| 4,236,395 A * | 12/1980 | Avaiusini | |
| 4,291,557 A | 9/1981 | Bulle et al. | 70/58 |
| 4,542,914 A | 9/1985 | Shropshire | 280/507 |
| 4,576,021 A * | 3/1986 | Holden | |
| 4,638,651 A | 1/1987 | Surko, Jr. | 70/364 |
| 4,716,746 A | 1/1988 | Journee | 70/161 |
| 4,766,989 A | 8/1988 | Maloeuvre et al. | 194/257 |
| 5,169,168 A | 12/1992 | Harry et al. | 280/511 |
| 5,265,450 A | 11/1993 | Doyle | 70/118 |
| 5,642,635 A | 7/1997 | Wen-Chyun | 70/58 |
| 5,741,022 A | 4/1998 | Wass et al. | 280/507 |
| 5,743,549 A | 4/1998 | Jackson | 280/507 |
| 5,823,029 A | 10/1998 | Eden, Jr. et al. | 70/358 |
| 5,860,669 A | 1/1999 | Wass et al. | 280/416.1 |
| 5,868,012 A | 2/1999 | Chun-Te et al. | 70/30 |
| 5,871,222 A | 2/1999 | Webb | 280/511 |
| 5,956,986 A | 9/1999 | Vonlanthen | 70/492 |
| 5,992,187 A * | 11/1999 | Derman | |
| 6,055,832 A * | 5/2000 | Wyers | |

* cited by examiner

*Primary Examiner*—Kevin Hurley
(74) *Attorney, Agent, or Firm*—McKee, Voorhees & Sease, P.L.C.

(57) ABSTRACT

A lock mechanism includes a casing having a cavity therein, a shaft with an annular recess insertable into the cavity, a lock tumbler with a rotatable output member, and a spring-biased rigid locking clip pivotally mounted to the casing in the cavity so as to normally engage the recess in the shaft to secure the shaft to the casing unless pivoted out of the recess by the output member of the lock tumbler. Such a lock mechanism can used be to solve many different security problems, including securing a ball to the ball socket of a trailer hitch as a deterrent to theft of the trailer.

18 Claims, 5 Drawing Sheets

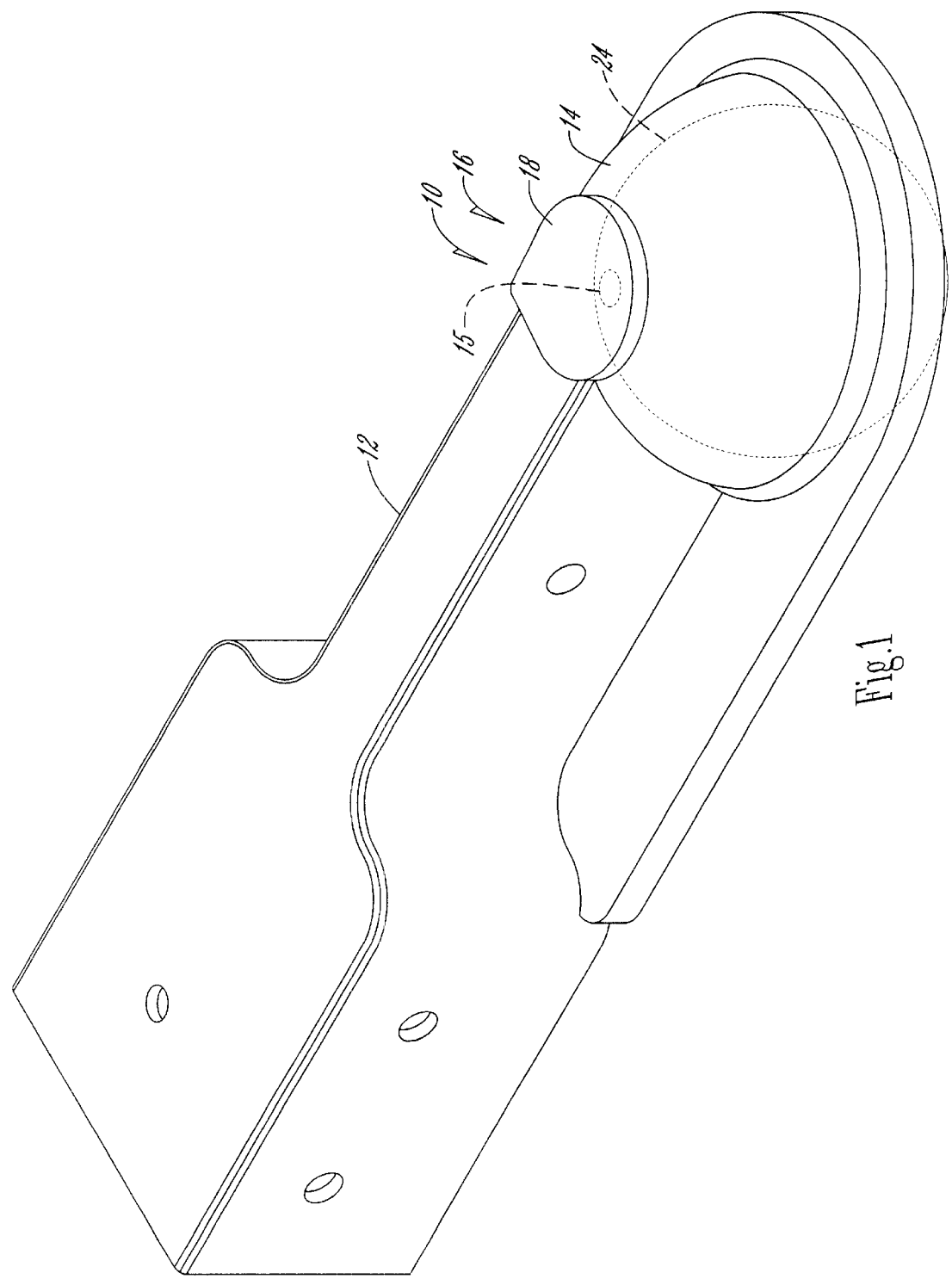

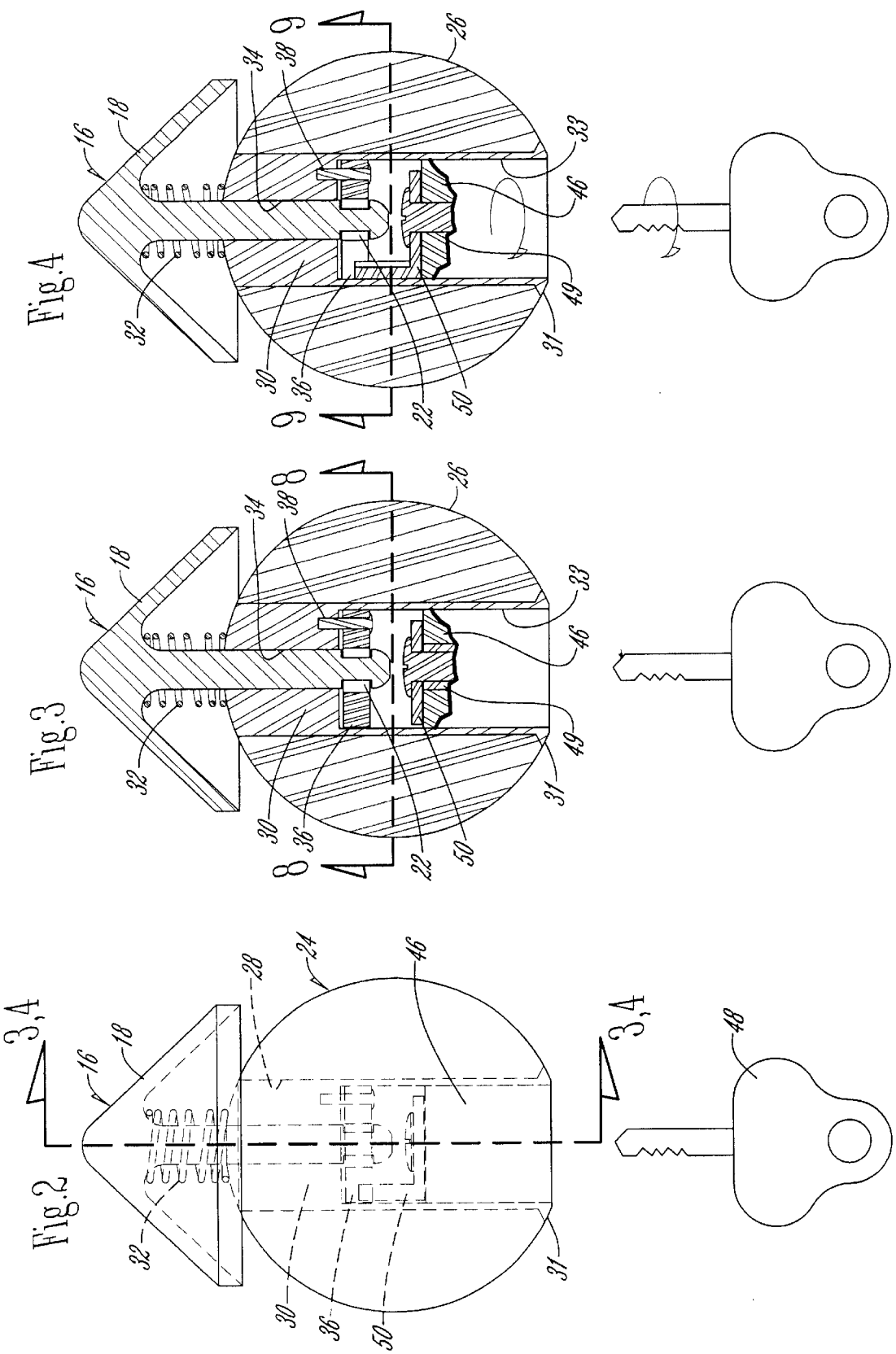

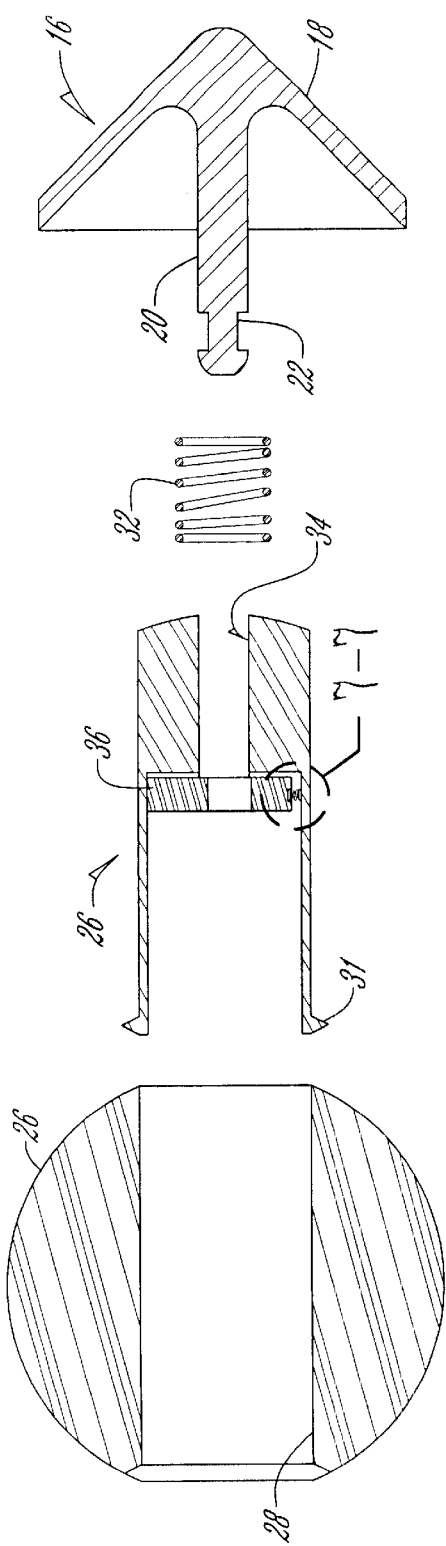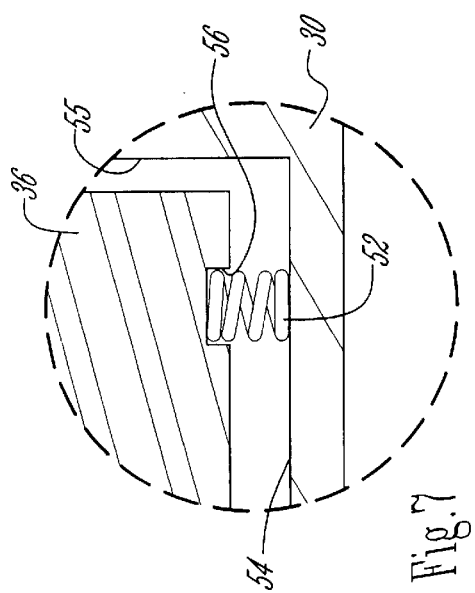
Fig.6
Fig.7

LOCKING MECHANISM FOR TRAILER HITCH SECURITY LOCK

BACKGROUND OF THE INVENTION

The present invention relates to the field of locking mechanisms. More particularly, this invention relates to a unique lock mechanism that is adaptable to many different locking applications, including but not limited to a trailer hitch security lock.

Various locking mechanisms have been used for trailer hitches. One shortcoming of many of the conventional locking mechanisms for trailer hitches is that they rely on an exposed padlock that can be cut quickly and easily by thieves using bolt cutters. One sharp blow with a hammer and chisel can also pop many padlocks open.

Some trailer hitch locking devices (such as shown by Jackson in U.S. Pat. No. 5,743,549, Nunnick, Jr. et al in U.S. Pat. No. 3,810,664; and Geresy in U.S. Pat. No. 3,226,133) utilize a ball-shaped plug installable in the ball socket of the trailer hitch to prevent thieves from hooking a towing vehicle to the trailer. Unfortunately, these ball-shaped plug locking mechanisms are relatively complex, difficult to manufacture and assemble, and are still not very robust or tamper-proof. For example, the ball-shaped plug of Geresy requires that several bores and an annulus be provided in the ball, along with a securement ring to hold the lock canister in the ball, a pair of curved springs retained between a pair of plates, and screws, etc. The round cross-section of the springs, their natural deformability, and small size makes them relatively easy to break and/or dislodge from the locking recess in the pin. Thus, there is a need for a simpler, more robust key-operated locking mechanism design for a ball-shaped plug lock and other applications.

Therefore, a primary objective of the present invention is the provision of an improved locking mechanism.

Another objective of this invention is the provision of a locking mechanism that has relatively few moving components.

Another objective of this invention is the provision of a locking mechanism that is easy to assemble and install, yet leaves no exposed components that thieves can quickly and easily cut, turn or pry on to open the lock.

Another objective of this invention is the provision of an improved locking mechanism for a trailer hitch security lock.

These and other objectives will be apparent from the drawings, as well as from the description and claims that follow.

SUMMARY OF THE INVENTION

The present invention relates to a lock mechanism that is adaptable to many different locking applications, including but not limited to a trailer hitch security lock. The lock mechanism includes a casing having a cavity therein, a shaft with an annular recess insertable into the cavity, a lock tumbler with a rotatable output member, and a spring-biased rigid locking clip pivotally mounted to the casing in the cavity so as to normally engage the recess in the shaft to secure the shaft to the casing unless pivoted out of the recess by the output member of the lock tumbler. A trailer hitch device utilizing this lock mechanism is described in detail herein.

BRIEF DESCRIPTION OF DRAWINGS

FIG. 1 is a perspective view of the lock mechanism and trailer hitch security device of this invention.

FIG. 2 is a front elevation view of the key-operated trailer hitch security device of FIG. 1 removed from the trailer hitch.

FIG. 3 is a partial cross-sectional view taken along line 3—3 in FIG. 2 and shows the locking mechanism in a locked position.

FIG. 4 is a partial cross-sectional view taken along line 4—4 in FIG. 2 and shows the locking mechanism in an open position.

FIG. 6 is an exploded assembly view in longitudinal cross-sectional view of some of the lock mechanism components from FIG. 5.

FIG. 7 is an enlarged cross-sectional view of the area designated 7—7 in FIG. 6 and shows the arrangement of the biasing spring in its guide hole.

DETAILED DESCRIPTION OF THE PREFERRED EMBODIMENT(S)

Figure 5:
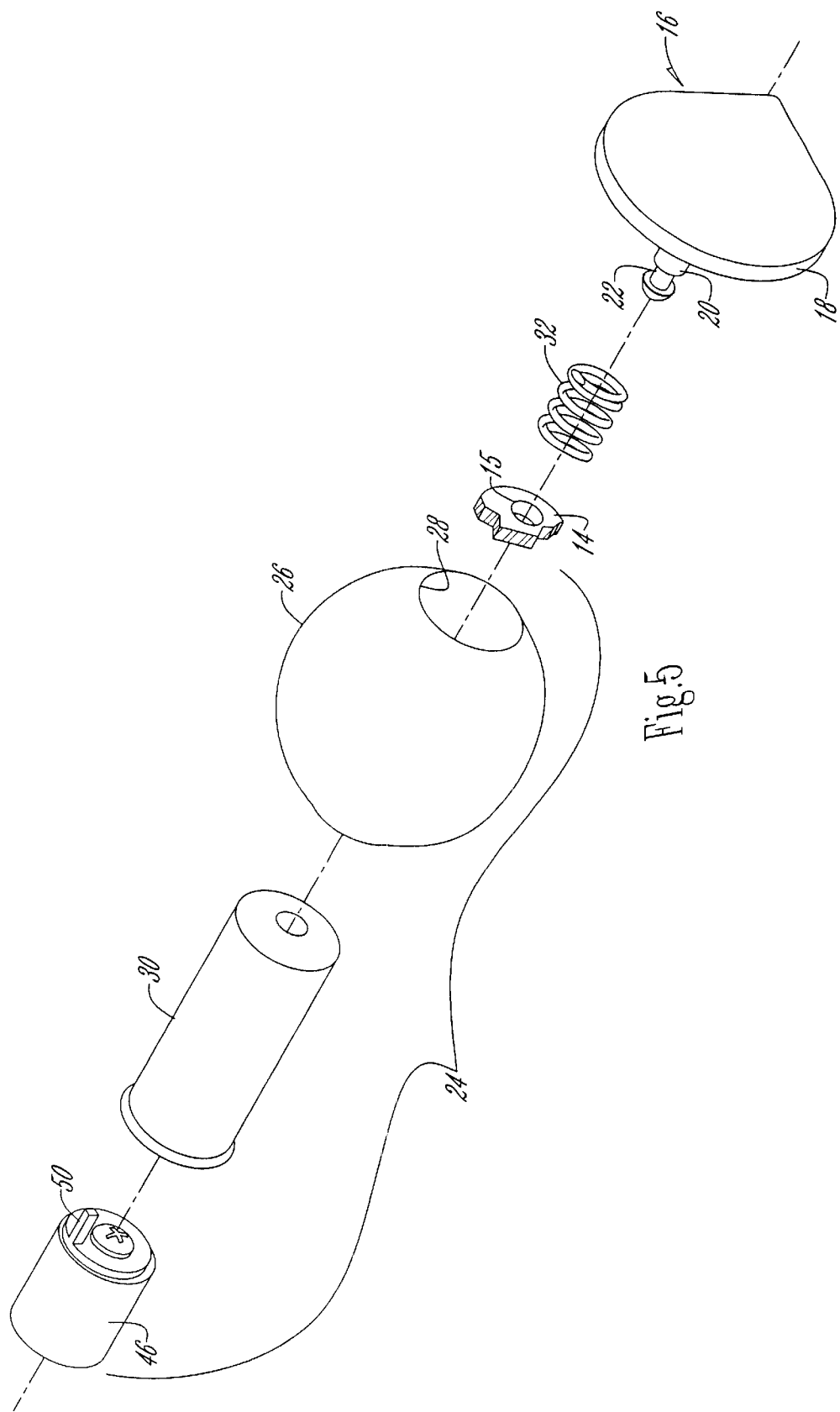
FIG. 5 is an exploded assembly view showing the trailer hitch security device of FIG. 1.

The trailer hitch security lock device of this invention is generally designated by the reference numeral 10 in FIG. 1. A hitch 12 conventionally includes a ball socket 14, but a hole 15 is provided in the present invention. A locking shaft 16 has an enlarged head 18 and an elongated shank 20 that protrudes from the head 18 and extends through the hole 15.

Referring to FIGS. 2–6, the shank 20 includes an annular recess 22. A key-operated ball lock assembly 24 can be inserted into the ball socket 14 of the trailer hitch 12 and selectively secures itself to the locking shaft 16. The ball lock assembly 24 includes a ball 26 that has a bore 28 extending therethrough. The ball 26 is preferably made of a substantially rigid, durable material such as steel, aluminum or hard rubber. A polymeric or plastic material will even suffice so long as it is sufficiently hard, strong and durable so as to withstand abrasion and a few blows with a hammer and chisel. A lock canister 30 is press-fitted into the bore 28 as shown in FIGS. 3 and 4. A conventional set screw (not shown) can be used to secure the lock canister 30 in the bore 28.

As best seen in FIG. 5, a spring 32 mounts around the shank 20 of the shaft 16, between the outer wall of the ball socket 14 and the enlarged head 18. Of course, this means that the spring 32 is also positioned between the enlarged head 18 and the ball lock assembly 24.

The lock canister 30 is a rigid hollow cylindrical tube with a large diameter blind bore 33 at one end so as to form a continuous side wall 54 and a top wall 55 when oriented in the position shown in FIGS. 3 and 4. A clearance bore 34 extends through the top wall 55 of the lock canister 30 and slidably accommodates the shank 20 of the lock shaft 16. Preferably the bottom of the canister 30 includes an outwardly flared flange 31 that prevents it from being pulled out the top of the ball 26. The canister 30 need not be formed separately from the ball 26. The canister configuration could be integrally formed with the ball 26 without significantly detracting from the invention.

Figure 10:
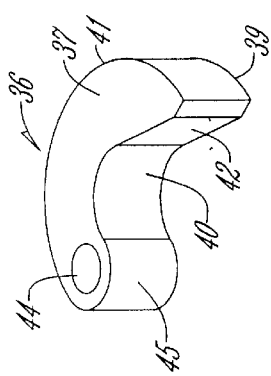
FIG. 10 is a perspective view of the locking clip of this invention.

A locking clip 36 is pivotally attached to the top wall 55 of the lock canister 30 by pin or screw 38. The pivot pin 38 extends through the locking clip 36 and into the top wall 55 of the lock canister 30. As best seen in FIG. 10, the locking clip 36 is generally C-shaped and has planar top and bottom surfaces 37, 39, a curved inner side surface 40, and a curved outer side surface 41. The outer side surface 41 of the locking clip 36 is defined by a radius of curvature that is less than the radius of the blind bore 33 in the lock canister 30. The curved inner side surface 40 of the flange portion 42 is defined by a radius of curvature that is substantially the same as the radius that defines the annular recess. The inner and outer side surfaces 40, 41 intersect the top and bottom surfaces 37, 39 at right angles. Thus, the locking clip has a substantially rectangular cross-section in a radially oriented vertical plane so that it securely mates with the recess 22.

The curved surface 40 extends through an arc of approximately 90 degrees to 180 degrees. Another planar inner side surface 42 extends obliquely from the curved surface 40 outwardly toward the surface 41. The clearance provided by making this surface oblique prevents the clip 36 from jamming in the recess 22. It also avoids leaving a sharp corner that can be used to "jimmy" the lock by repeated small movements, which tend to push the clip 36 out of thje recess 22 at the sharp corner. A pivot hole 44 extends vertically through the locking clip adjacent to one of its ends to slidingly receive the pivot pin 38. The end of the clip 36 adjacent the hole 44 is rounded so as to permit the clip 36 to pivot without interferring with the shaft shank 20 or the wall 54.

A conventional lock tumbler cylinder 46 is press-fitted or otherwise secured in the blind bore 33 of the lock canister 30. The lock tumbler 46 has a centrally located rotatable ouput portion 49 operated by key 48 in a conventional and well-known manner that is not particularly relevant to this invention. However, a sweep arm 50 secures to the output portion 49 of the lock tumbler 46 so that it rotates when the key 48 is turned. The sweep arm 50 is capable of engagement with the locking clip 36, preferably at an end edge of the base portion 40. The sweep arm 50 includes a base portioin attached to the rotatable output portion 49 of the tumbler 46 and an upright leg portion for engaging the clip 36.

A spring 52 of the coiled compression type is positioned between the locking clip 36 and the wall 54 of the blind bore 33 in the lock canister 30. A guide hole 56 extends into the outer wall of the locking clip 36 so as to guide and retain the spring 52 in the proper position during assembly and use. See FIGS. 6 and 7.

To assemble the trailer hitch security lock device 10 of this invention, the user inserts the shank 20 of the shaft 16 through the spring 32 and the hole 15 in the ball socket 14. The ball lock assembly 24 can be assembled by the end user, but is preferably supplied in a preassembled condition by the manufacturer. The manufacturer or assembler inserts the locking clip 36 into the blind bore 33 of the lock canister 30 and pivotally secures it with the pivot pin 38. The assembler inserts the spring 52 into the guide hole 56. The sweep arm 50 is secured for rotation with the rotatable portion 49 of the lock tumbler 46. The assembler then positions the lock tumbler cylinder 46 so that the sweep arm 50 is aligned with the edge of the locking clip 36 that is remote from the pivot pin 38. The assembler then press fits or otherwise secures the lock cylinder 46 in the blind bore 33 of the lock canister 30 as shown in FIGS. 3 and 4. A conventional set screw arrangement (not shown) can be used to secure the lock cylinder 46 in the lock canister 30. Alignment marks on the respective parts may also be provided to assist in the assembly process.

Figure 9:
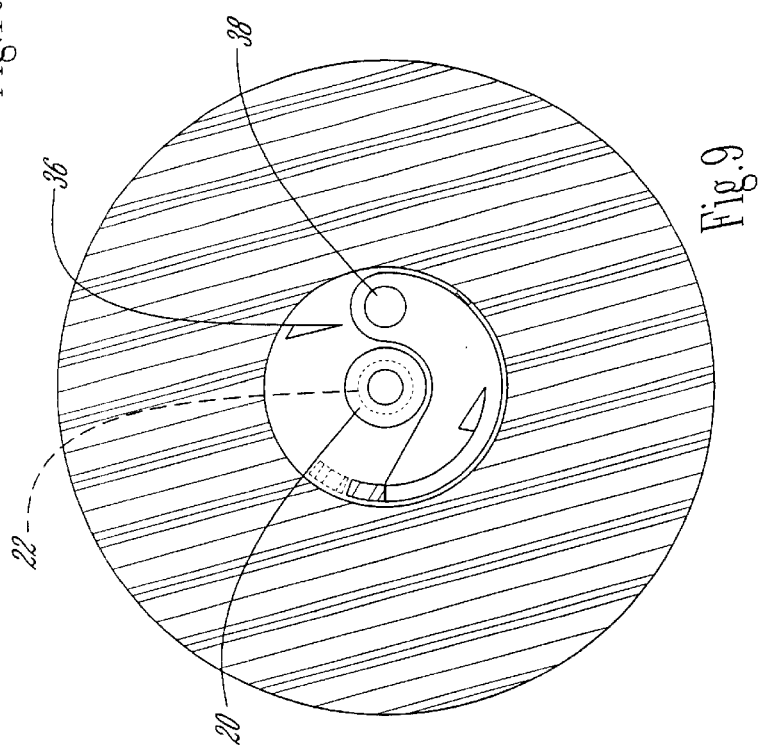
FIG. 9 is a transverse cross-sectional view of the lock mechanism taken along line 9—9 in FIG. 4. The locking clip is shown in the released or unlocked position.
Figure 8:
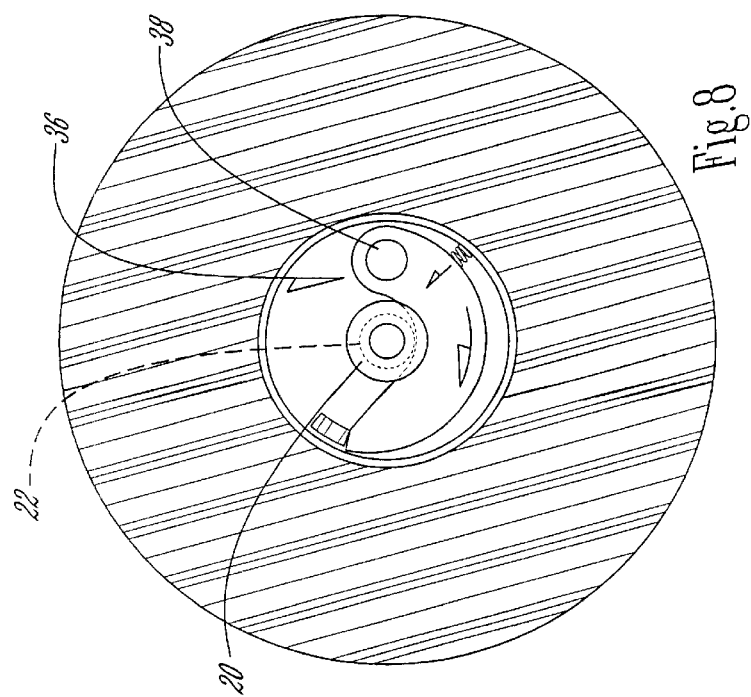
FIG. 8 is a transverse or horizontal cross-sectional view of the lock mechanism taken along line 8—8 in FIG. 3. The locking clip is shown in the engaged or locked position.

In operation, the completed ball lock assembly 24 inserts into the ball socket 14 from underneath. The shank 20 of the shaft 16 is aligned with the clearance hole 34 in the lock canister 30. The key 48 is rotated in one direction, as shown in FIGS. 4 and 9, so as to swing or pivot the locking clip 36 and allow the shank 20 to be completely inserted into the ball 26. Then the key 48 is rotated in the opposite direction, thereby allowing the locking clip 36 to pivot or swing so that the flange portion 42 engages the annular recess 22, as shown in FIGS. 3 and 8. Thus, the ball lock assembly 24 is securely fastened to the ball socket 14, which prevents the ball socket 14 from being used to tow the trailer. An authorized user merely turns the key 48 to pivot the clip 36 and release the locking mechanism.

With one simple sweep arm and locking clip connection, the present invention provides a reliable locking mechanism for engaging the annular recess 22 in the shaft 16. The locking clip 36 of this invention is rigid rather than resilient and therefore is extremely difficult to dislodge from its locked position in the annular recess 22. The device 10 of this invention (with its unique lock mechanism) is simple, easy to assemble, and robust in deterring thieves.

Thus, it can be seen that the present invention at least satisfies its stated objectives.

The lock tumbler 46 shown in the preferred embodiment is key-operated. However, a combination lock tumbler or other type of tumbler would suffice. It is also contemplated that a dual sweep arm and locking clip structure could be formed utilizing the principles of the present invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A locking mechanism comprising:

a lock casing having an elongated cavity formed therein with opposing open and closed ends and a hole extending longitudinally into the cavity through the closed end;

an elongated shaft having an outer surface thereon with an annular recess formed therein, the shaft being insertable into the cavity through the hole in the casing so that the annular recess extends into the cavity;

a rigid locking clip disposed in the cavity and pivotally pinned to the casing along a pivot axis that extends parallel to and offset from the shaft when the shaft is inserted into the cavity, the clip being adapted to engage the annular recess of the shaft;

a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and a spring for biasing the locking clip into the annular recess in the shaft unless the rotatable output portion of the tumbler engages and pivots the locking clip out of engagement with the annular recess;

whereby the shaft is secured to the casing when the locking clip engages the annular recess and is released from securement to the casing when the rotatable portion of the tumbler overcomes the biasing spring to pivot the locking clip out of the annular recess.

2. The lock mechanism of claim 1 wherein the casing is a ball member adapted to be inserted in a ball socket of a trailer hitch.

3. A locking mechanism comprising:

a lock casing having an elongated cavity formed therein with opposing open and closed ends and a hole extending longitudinally into the cavity through the closed end;

an elongated shaft having an outer surface thereon with an annular recess formed therein, the shaft being insertable into the cavity through the hole in the casing so that the annular recess extends into the cavity;

a rigid locking clip disposed in the cavity and pivotally connected to the casing along a pivot axis that extends parallel to the shaft when the shaft is inserted into the cavity, the clip being adapted to engage the annular recess of the shaft;

a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and a spring for biasing the locking clip into the annular recess in the shaft unless the rotatable output portion of the tumbler engages and pivots the locking clip out of engagement with the annular recess;

whereby the shaft is secured to the casing when the locking clip engages the annular recess and is released from securement to the casing when the rotatable portion of the tumbler overcomes the biasing spring to pivot the locking clip out of the annular recess;

wherein the spring is a coiled compression spring positioned between the locking clip and the casing.

4. The lock mechanism of claim 3 wherein the locking clip has an inner side surface adjacent the shaft and an outer side surface generally opposite the inner side surface, the outer side surface having a hole therein for guidingly receiving an end of the spring.

5. The lock mechanism of claim 3 wherein the shaft has a round shank and an enlarged head protruding radially outward from the shank, the annular recess being a circumferential annular recess formed in the shank and the enlarged head residing outside the casing when the shaft is inserted therein.

6. The lock mechanism of claim 3 where the lock tumbler is a key-operated lock tumbler.

7. A locking mechanism comprising:

a lock casing having an elongated cavity formed therein with opposing open and closed ends and a hole extending longitudinally into the cavity through the closed end;

an elongated shaft having an outer surface thereon with an annular recess formed therein, the shaft being insertable into the cavity through the hole in the casing so that the annular recess extends into the cavity;

a rigid locking clip disposed in the cavity and pivotally connected to the casing along a pivot axis that extends parallel to the shaft when the shaft is inserted into the cavity, the clip being adapted to engage the annular recess of the shaft;

a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and a spring for biasing the locking clip into the annular recess in the shaft unless the rotatable output portion of the tumbler engages and pivots the locking clip out of engagement with the annular recess;

whereby the shaft is secured to the casing when the locking clip engages the annular recess and is released from securement to the casing when the rotatable portion of the tumbler overcomes the biasing spring to pivot the locking clip out of the annular recess;

wherein the tumbler and the shaft share a common longitudinal centerline when inserted into the casing and a single locking clip is provided, the locking clip pivoting about a single pivot axis that is radially offset from the common longitudinal centerline.

8. A locking mechanism comprising:

a lock casing having an elongated cavity formed therein with opposing open and closed ends and a hole extending longitudinally into the cavity through the closed end;

an elongated shaft having an outer surface thereon with an annular recess formed therein, the shaft being insertable into the cavity through the hole in the casing so that the annular recess extends into the cavity;

a rigid locking clip disposed in the cavity and pivotally connected to the casing along a pivot axis that extends parallel to the shaft when the shaft is inserted into the cavity, the clip being adapted to engage the annular recess of the shaft;

a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and a spring for biasing the locking clip into the annular recess in the shaft unless the rotatable output portion of the tumbler engages and pivots the locking clip out of engagement with the annular recess;

whereby the shaft is secured to the casing when the locking clip engages the annular recess and is released from securement to the casing when the rotatable portion of the tumbler overcomes the biasing spring to pivot the locking clip out of the annular recess;

wherein the locking clip has parallel planar top and bottom surfaces and a side surface adjacent the shaft, said side surface intersecting the top and bottom surfaces at right angles.

9. The lock mechanism of claim 8 wherein the annular recess includes a surface thereon defined by a radius perpendicular to a longitudinal axis of the shaft and the locking clip is generally C-shaped, the locking clip including an curved outer side surface and a curved inner side surface constituting the side surface adjacent the shaft, the curved inner side surface having a radius of curvature that is approximately equal to the radius of the annular recess.

10. The lock mechanism of claim 9 wherein the curved inner side surface of the locking clip extends through an arc of between approximately 90 to 180 degrees.

11. The lock mechanism of claim 10 wherein the locking clip includes opposite ends and a vertical planar inner side surface adjacent one of the ends extending obliquely from the curved inner side surface toward the curved outer surface.

12. The lock mechanism of claim 10 wherein the locking clip includes opposite ends, a pivot hole extending through the locking clip adjacent one of the ends so as to define the pivot axis, the end adjacent the pivot hole having a rounded side edge so as to permit the locking clip to pivot without interfering with the shaft.

13. A locking mechanism comprising:
   a lock casing having an elongated cavity formed therein with opposing open and closed ends and a hole extending longitudinally into the cavity through the closed end;
   an elongated shaft having an outer surface thereon with an annular recess formed therein, the shaft being insertable into the cavity through the hole in the casing so that the annular recess extends into the cavity;
   a rigid locking clip disposed in the cavity and pivotally connected to the casing along a pivot axis that extends parallel to the shaft when the shaft is inserted into the cavity, the clip being adapted to engage the annular recess of the shaft;
   a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and
   a spring for biasing the locking clip into the annular recess in the shaft unless the rotatable output portion of the tumbler engages and pivots the locking clip out of engagement with the annular recess;
   whereby the shaft is secured to the casing when the locking clip engages the annular recess and is released from securement to the casing when the rotatable portion of the tumbler overcomes the biasing spring to pivot the locking clip out of the annular recess; and
   a pivot pin;
   wherein the locking clip and casing each have a hole therein for receiving the pivot pin so as to pivotally connect the locking clip to the casing.

14. The lock mechanism of claim 13 wherein the casing includes an outer shell and a closed ended hollow cylindrical canister secured in the outer shell so as to define the cavity.

15. A locking mechanism comprising:
   a lock casing having an elongated cavity formed therein with opposing open and closed ends and a hole extending longitudinally into the cavity through the closed end;
   an elongated shaft having an outer surface thereon with an annular recess formed therein, the shaft being insertable into the cavity through the hole in the casing so that the annular recess extends into the cavity;
   a rigid locking clip disposed in the cavity and pivotally connected to the casing along a pivot axis that extends parallel to the shaft when the shaft is inserted into the cavity, the clip being adapted to engage the annular recess of the shaft;
   a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and
   a spring for biasing the locking clip into the annular recess in the shaft unless the rotatable output portion of the tumbler engages and pivots the locking clip out of engagement with the annular recess;
   whereby the shaft is secured to the casing when the locking clip engages the annular recess and is released from securement to the casing when the rotatable portion of the tumbler overcomes the biasing spring to pivot the locking clip out of the annular recess;
   wherein the rotatable output portion includes a sweep arm detachably mounted to the lock tumbler, the sweep arm comprising a base portion extending transverse to the axis of rotation of the output portion and an upright leg thereon offset from and parallel to the axis of rotation so as to engage the locking clip.

16. A locking mechanism comprising:
   a lock casing having an elongated cavity formed therein with opposing open and closed ends and a hole extending longitudinally into the cavity through the closed end;
   an elongated shaft having an outer surface thereon with an annular recess formed therein, the shaft being insertable into the cavity through the hole in the casing so that the annular recess extends into the cavity;
   a rigid locking clip disposed in the cavity and pivotally connected to the casing along a pivot axis that extends parallel to the shaft when the shaft is inserted into the cavity, the clip being adapted to engage the annular recess of the shaft;
   a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and
   a spring for biasing the locking clip into the annular recess in the shaft unless the rotatable output portion of the tumbler engages and pivots the locking clip out of engagement with the annular recess;
   whereby the shaft is secured to the casing when the locking clip engages the annular recess and is released from securement to the casing when the rotatable portion of the tumbler overcomes the biasing spring to pivot the locking clip out of the annular recess;
   wherein the casing is a ball member adapted to be inserted in a ball socket of a trailer hitch;
   wherein the ball socket has an outer surface and the shaft has an enlarged head, the lock mechanism further including a spring being positioned between the enlarged head and the outer surface of the ball socket.

17. A hitch security lock device for a trailer hitch having a ball socket formed therein, the ball socket having an outer wall with a hole extending therethrough, the device comprising:
   a ball member adapted to be inserted into the ball socket and defining a lock casing; the lock casing having an elongated cavity formed therein with opposing open and closed ends and a hole extending longitudinally into the cavity through the closed end;

an elongated shaft including a shank and an enlarged head protruding radially outward from the shank, the shank including an outer surface thereon with an annular recess formed therein, the shank of the shaft being inserted into the hole in the outer wall of the ball socket then into the hole in the casing so that the enlarged head adjoins the outer wall of the ball socket and the annular recess extends into the cavity;

a rigid non-resilient locking clip disposed in the cavity and pivotally pinned to the casing along a pivot axis that extends parallel to and offset from the shaft when the shaft is inserted into the cavity, the clip being adapted to engage the annular recess of the shaft;

a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and a spring for biasing the locking clip into the annular recess in the shaft unless the rotatable output portion of the tumbler engages and pivots the locking clip out of engagement with the annular recess;

whereby the shaft secures the casing to the ball socket when the locking clip engages the annular recess and the casing is released from securement when the rotatable portion of the tumbler overcomes the biasing spring to pivot the locking clip completely out of the annular recess.

18. A hitch security lock device for a trailer hitch having a ball socket formed therein, the ball socket having an outer wall with a hole extending therethrough, the device comprising:

a ball member adapted to be inserted into the ball socket and defining a lock casing; the lock casing having an elongated cavity formed therein with opposing open and closed ends and a hole extending longitudinally into the cavity through the closed end;

an elongated shaft including a shank and an enlarged head protruding radially outward from the shank, the shank including an outer surface thereon with an annular recess formed therein, the shank of the shaft being inserted into the hole in the outer wall of the ball socket then into the hole in the casing so that the enlarged head adjoins the outer wall of the ball socket and the annular recess extends into the cavity;

a rigid non-resilient locking clip disposed in the cavity and pivotally connected to the casing along a pivot axis that extends parallel to the shaft when the shaft is inserted into the cavity, the clip being adapted to engage the annular recess of the shaft;

a lock tumbler attached to the casing in covering relation to the open end of the cavity and including a rotatable output portion thereon extending inside the cavity, the rotatable output portion being adjacent to the locking clip so as to be capable of engaging the locking clip at a point radially offset from the locking clip pivot axis when the rotatable output portion is rotated; and a spring for biasing the locking clip into the annular recess in the shaft unless the rotatable output portion of the tumbler engages and pivots the locking clip out of engagement with the annular recess;

whereby the shaft secures the casing to the ball socket when the locking clip engages the annular recess and the casing is released from securement when the rotatable portion of the tumbler overcomes the biasing spring to pivot the locking clip completely out of the annular recess;

wherein the ball socket has an outer surface and the shaft has an enlarged head, a spring being positioned between the enlarged head and the outer surface of the ball socket.

* * * * *